(12) United States Patent
Taylor

(10) Patent No.: US 10,047,884 B2
(45) Date of Patent: Aug. 14, 2018

(54) PIPE CONNECTORS AND SYSTEMS

(71) Applicant: Flash Line Technologies, INC., Riverton, UT (US)

(72) Inventor: Jason G. Taylor, Riverton, UT (US)

(73) Assignee: FLASH LINE TECHNOLOGIES, INC., Riverton, UT (US)

( * ) Notice: Subject to any disclaimer, the term of this patent is extended or adjusted under 35 U.S.C. 154(b) by 254 days.

(21) Appl. No.: 15/135,129

(22) Filed: Apr. 21, 2016

(65) Prior Publication Data

US 2016/0230911 A1 Aug. 11, 2016

Related U.S. Application Data

(63) Continuation-in-part of application No. 14/555,402, filed on Nov. 26, 2014, now Pat. No. 9,784,393.

(60) Provisional application No. 62/049,240, filed on Sep. 11, 2014, provisional application No. 61/990,230, filed on May 8, 2014, provisional application No. 61/911,704, filed on Dec. 4, 2013.

(51) Int. Cl.
| | |
|---|---|
| *F16L 19/06* | (2006.01) |
| *F16L 37/091* | (2006.01) |
| *F16L 33/22* | (2006.01) |
| *F16L 19/08* | (2006.01) |

(52) U.S. Cl.
CPC ........... *F16L 19/061* (2013.01); *F16L 19/086* (2013.01); *F16L 33/224* (2013.01); *F16L 37/091* (2013.01)

(58) Field of Classification Search
CPC ..... F16L 37/088; F16L 37/091; F16L 19/061; F16L 19/086; F16L 33/224
USPC ......................................... 285/342, 348, 354
See application file for complete search history.

(56) References Cited

U.S. PATENT DOCUMENTS

| | | | |
|---|---|---|---|
| 2,939,729 A | 6/1960 | O'Shaughnessy, Jr. |
| 3,398,977 A | 8/1968 | Yoneda |
| 4,138,145 A | 2/1979 | Lawrence |
| 4,146,254 A | 3/1979 | Turner et al. |

(Continued)

FOREIGN PATENT DOCUMENTS

| | | |
|---|---|---|
| EP | 1748242 A1 | 1/2007 |
| EP | 2435744 B1 | 10/2013 |

OTHER PUBLICATIONS

Canadian Office Action from CA Application No. 2932714, dated Jun. 27, 2017.

(Continued)

*Primary Examiner* — Greg Binda
*Assistant Examiner* — Zachary T Dragicevich
(74) *Attorney, Agent, or Firm* — Workman Nydgegger

(57) ABSTRACT

A flexible connection system includes one or more pipe connectors coupled to a section of flexible hose. A pipe connector includes a housing body defining an axial bore arranged to receive a length of pipe. A plurality of sealing members are positionable in a stacked configuration within the axial bore. The sealing members define a first opening through which the length of pipe can pass and are arranged to form a seal between the length of pipe and the housing body. A locking member is positionable in the axial bore above the sealing members. The locking member defines a second opening. The length of pipe is movable through the second opening in a first direction and the locking member engages the length of pipe when the pipe is forced in a second direction opposite the first direction to form a one-way stop.

11 Claims, 15 Drawing Sheets

(56) References Cited

U.S. PATENT DOCUMENTS

| | | | |
|---|---|---|---|
| 4,637,636 A | 1/1987 | Guest | |
| 4,878,697 A | 11/1989 | Henry | |
| 5,005,877 A | 4/1991 | Hayman | |
| 5,957,509 A | 9/1999 | Komolrochanaporn | |
| 6,264,250 B1 | 7/2001 | Teraoka et al. | |
| 6,502,865 B1 | 1/2003 | Steele | |
| 6,685,230 B1 | 2/2004 | Bottura | |
| 6,824,172 B1 | 11/2004 | Komolrochanaporn | |
| 2004/0178630 A1 | 9/2004 | Davidson | |
| 2009/0236851 A1* | 9/2009 | Hampel | F16L 33/224 |
| 2011/0012350 A1 | 1/2011 | Camozzi et al. | |
| 2012/0174374 A1 | 7/2012 | Crompton et al. | |
| 2013/0168959 A1 | 7/2013 | Turk | |
| 2015/0308590 A1* | 10/2015 | Liang | F16L 33/224 |

OTHER PUBLICATIONS

International Search Report from PCT Application No. PCT/US14/68113, dated Mar. 16, 2015.
"2014 Sharkbite Catalog Now Including Sharkbite 2XL", Sharkbite Plumbing Solutions, May 2014, 28 Pages.

\* cited by examiner

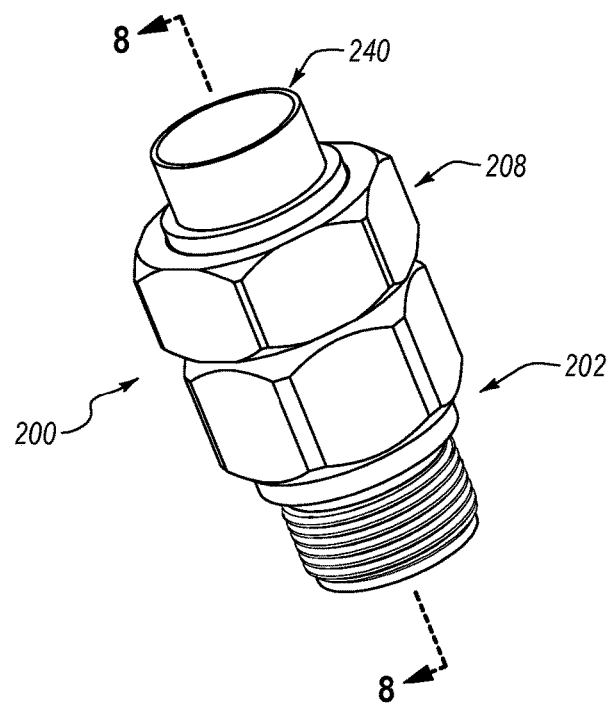
FIG. 7
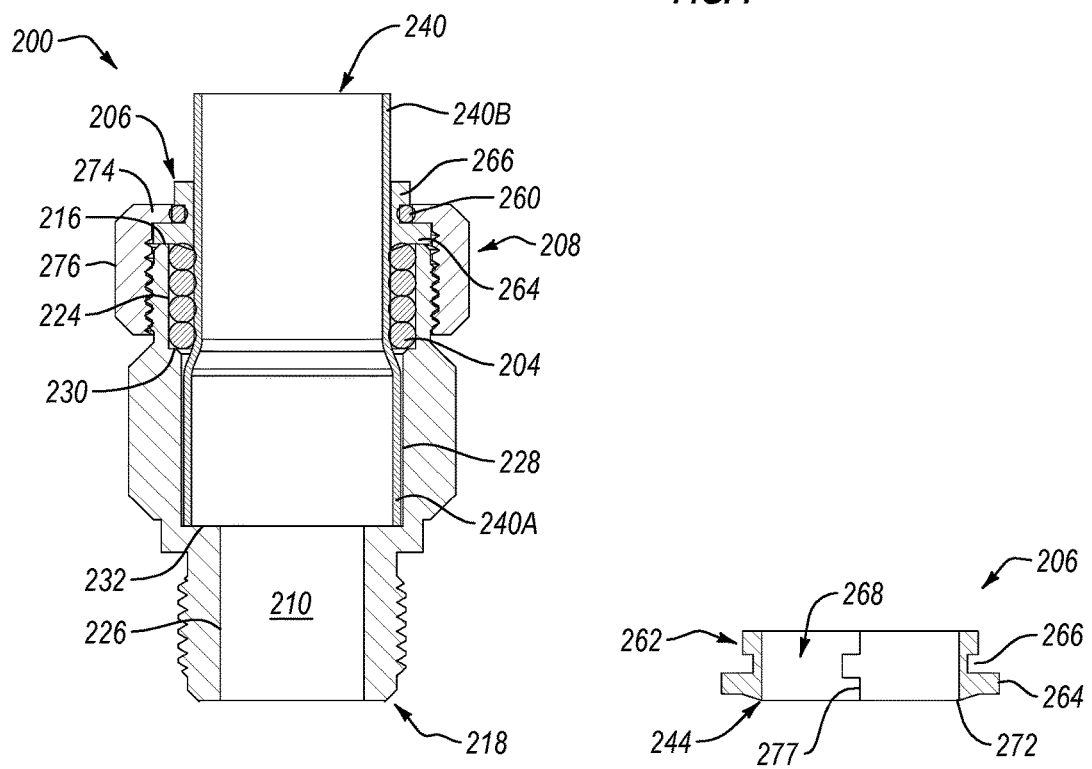
FIG. 8
FIG. 9

PIPE CONNECTORS AND SYSTEMS

CROSS-REFERENCE TO RELATED APPLICATIONS

This application is a continuation-in-part of U.S. patent application Ser. No. 14/555,402, entitled "Pipe Connectors and Systems," filed Nov. 26, 2014, now U.S. Pat. No. 9,784,393, which claims the benefit of, and priority to U.S. provisional patent application 61/911,704, entitled "Push Connect Fittings, Systems, and Methods of Use," filed Dec. 4, 2013, U.S. provisional patent application 61/990,230, entitled "Push Fittings and Methods of Use," filed May 8, 2014, and U.S. provisional patent application 62/049,240, entitled "Push Connect Fittings," filed Sep. 11, 2014, each of which is incorporated herein in its entirety by this reference.

BACKGROUND

Plastic and metal pipes have long been used for the conveying of fluids such as liquids and gases. These pipes can include connectors or fittings utilized to connect together different sections of pipe. Such fittings must be capable of providing a fluid tight seal over a range of temperatures, pressures and a variety of exterior ambient conditions. For instance, air conditioning systems for office buildings and residential buildings often include an indoor unit and an outdoor unit that are connected together by a gaseous refrigerant pipe and a liquid refrigerant pipe to form a refrigerant circuit. These refrigerant pipes are commonly copper pipes utilizing copper fittings, such as standard couplings, tees, and elbows, to connect respective lengths of each pipe together. Typically, in this type of connection neither the lengths of copper pipe nor the fittings have threads. Instead, the fittings have openings designed to receive and surround the entire circumference of the end portion of the pipe such that the pipe is held snugly against the interior surfaces of the opening in the fitting. A flux/solder combination or solder is then used to create a fluid-tight seal between the fitting and the length of pipe.

This type of connection tends to suffer from a number of drawbacks. For example, soldering the pipe and fitting together can be time consuming and labor intensive. Consequently, the cost of connecting the pipes can be expensive. Additionally, due to space restrictions or other conditions related to the soldering work, connecting the pipe and fittings can be hazardous and/or present a fire danger. In many situations the fitting is soldered onto the pipe at a distance that is only inches away from a building. Another drawback of this connection system is that a user cannot solder a pipe with moisture in the pipe because steam will develop and pressurize the pipe so that the solder does not flow in between the pipe and the fitting.

SUMMARY

The disclosure describes various embodiments of a pipe connector providing a construction and design allowing for a safer and quicker connection to pipes or other components. The embodiments described herein can include a housing body defining an axial bore arranged to receive a length of pipe. A plurality of sealing members can be positioned in a stacked configuration within the axial bore. The sealing members define a first opening through which the length of pipe can pass and are arranged to form a seal between the length of pipe and the housing body. A locking member can be positioned in the axial bore above the sealing members. The locking member defines a second opening and the length of pipe is movable through the second opening in a first direction. The locking member engages the length of pipe when the pipe is forced in a second direction opposite the first direction to form a one-way stop.

According to an embodiment, the locking member can be a segmented collar split into two or more segments that are arranged to be coupled together around the length of pipe. A bottom portion of the segmented collar can define a locking edge having a sharpened configuration arranged to form the one-way stop when engaged with the pipe.

In certain embodiments, a pipe connector is coupled to a flexible hose or flexible pipe to form a flexible connection assembly. The flexible connection assembly may be utilized for quick and effective coupling of a section of flexible hose to another section of pipe (e.g., a copper pipe or other rigid pipe, or to a flexible pipe or pipe having a flexible portion). In certain embodiments, a pipe connector is coupled to a first flexible hose or flexible pipe at a first end, and to another flexible hose or flexible pipe at second end.

Additional features and advantages of the disclosure will be set forth in the description which follows, and in part will be obvious from the description, or may be learned by the practice of the invention. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

These and other features, aspects, and advantages of the present disclosure will become better understood regarding the following description, appended claims, and accompanying drawings.

FIG. 7 is a view of the pipe connector shown in FIG. 6 in assembled form, with a swaged pipe inserted into the bore of the axial bore.

FIG. 8 is a cross-section view of the assembly shown in FIG. 7 taken along line 8-8.

FIG. 9 is a cross-section view of the locking member shown in FIG. 8.

DETAILED DESCRIPTION OF VARIOUS EMBODIMENTS

Figure 1:
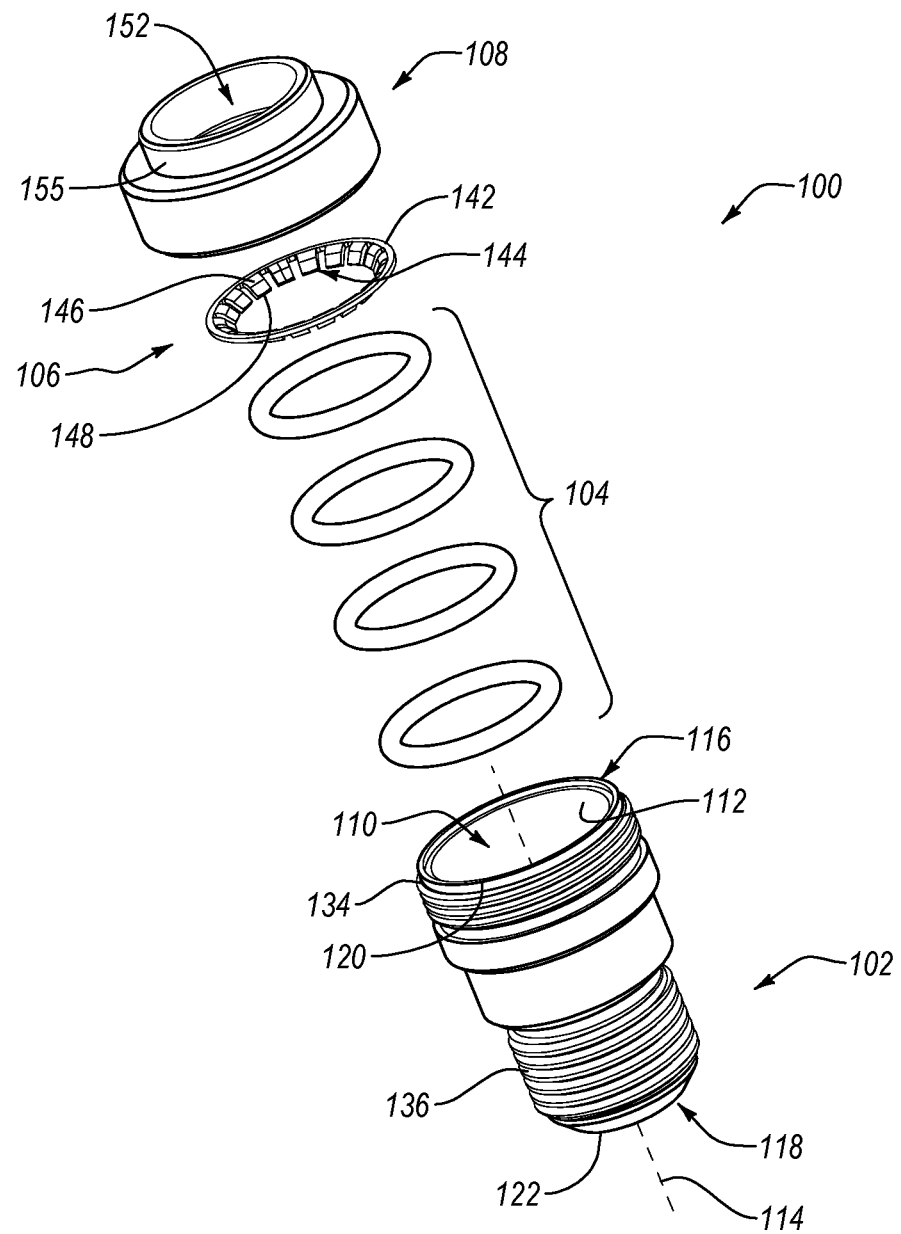
FIG. 1 is an exploded perspective view of a pipe connector according to an embodiment.

A better understanding of different embodiments of the disclosure may be had from the following description read with the accompanying drawings in which like reference characters refer to like elements.

The exemplary embodiments of the pipe connectors described herein are generally described as being used for connection to copper refrigerant pipes, however, it will be appreciated that the pipe connectors can be used in a number of different applications and with a variety of different types of pipe, including, but not limited to, pipes that are flexible or that have at least a portion that is flexible, polyvinyl chloride ("PVC") pipes, cross-link polyethylene ("PEX") pipes, iron pipes, steel pipes, brass pipes, aluminum pipes, rubber pipes, or any other suitable type of pipe. Moreover, the term "pipe" can mean a pipe, a tube, a hose, a line, and/or any other conduit.

In addition, pipe connectors disclosed herein may be used to connect to flexible pipes/hoses formed from rubber or other natural and/or synthetic polymer materials, metal materials (e.g., stainless steel, copper, aluminum, and/or other metals or alloys), fibers (e.g., carbon fiber materials), resin, or composites/combinations thereof. Flexible hoses may be formed with a braided and/or corrugated construction (e.g., wire braid, tape braid, twilled braid, etc.). Some embodiments of flexible pipes/hoses may have an interior section surrounded by one or more outer shell sections, such as an interior section surrounded by one or more layers of braided material. Certain embodiments of pipe connectors are coupled with sections of flexible hose (e.g., one or more of the foregoing types of flexible hoses) to form flexible connection assemblies.

While the disclosure is susceptible to various modifications and alternative constructions, certain illustrative embodiments are in the drawings and described below. It should be understood, however, there is no intention to limit the disclosure to the embodiments disclosed, but on the contrary, that the intention covers all modifications, alternative constructions, combinations, and equivalents falling with the spirit and scope of the disclosure.

Pipe Connectors

With reference to FIGS. 1-5, an exemplary embodiment of a pipe connector comprises a push connector 100 including a housing body 102, sealing members 104, a locking member 106, and a retaining member 108.

Figure 2:
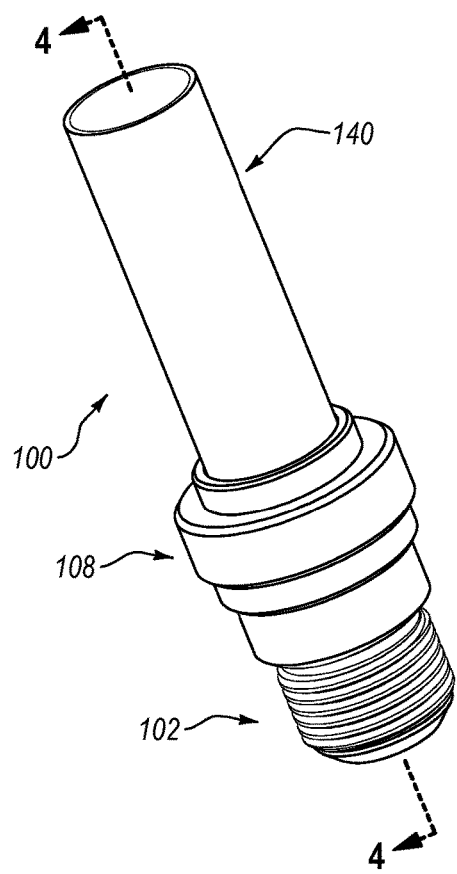
FIG. 2 is a view of the pipe connector shown in FIG. 1 in assembled form, with a pipe inserted into the bore of the housing body.

As seen in FIGS. 1-2, the housing body 102 can include an axial bore 110 having a peripheral internal bore wall 112 and a bore central axis 114. The axial bore 110 can have any desired shape, but is shown having a generally circular or cylindrical shape. The housing body 102 can include a housing top 116 and a housing bottom 118, and the axial bore 110 is arranged so that the top opening 120 of the axial bore 110 is located at or adjacent to the housing top 116 and the bottom opening 122 of the axial bore 110 is located at or adjacent to the housing bottom 118. This arrangement can allow fluid to flow through the housing body 102. In other embodiments, the connector 100 can be configured as a cap member or a plug with the housing bottom 118 defining a closed bottom of the axial bore 110 arranged to prevent fluid through the housing body 102.

The housing body 102 can be formed of a metal material. While the housing body 102 is described comprising metal, it will be appreciated that other suitable materials are possible. For instance, the housing body 102 may comprise polymers, a plastic material, a resin, carbon-based or other composites, combination thereof, or any other suitable material. The construction of the housing body 102 can be dependent on a number of different factors, such as the anticipated size and/or type of pipe inserted in the connector 100, the type of connection to be made, the anticipated operating pressure, fluid type, user preference, and/or other factors.

Figure 3:
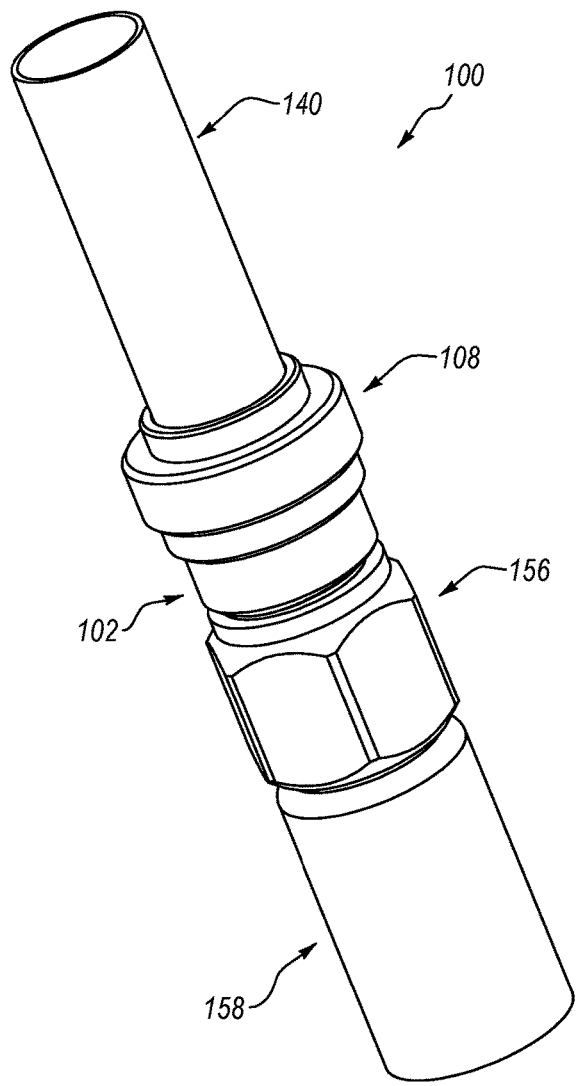
FIG. 3 is view of the pipe connector shown in FIG. 1 in assembled form, connected to a barbed attachment assembly.

The housing body 102 can include one or more connection features for connecting the housing body 102 to other components. The housing body 102 can include an upper threaded portion 134 located towards the housing top 116 and a lower threaded portion 136 located towards the housing bottom 118. The lower threaded portion 136 can facilitate a number of different types of connections. For instance, as shown in FIG. 3, the lower threaded portion 136 can facilitate connection of the housing body 102 to a barbed attachment assembly 156 and ferrule 158.

Alternatively, the housing body 102 optionally may include wrench flats disposed about the outer periphery of the housing body 102. The wrench flats can be arranged to receive a wrench or other tool for rotating the connector 100 or resisting rotation of the connector 100 as needed. The wrench flats can also be used to connect, disconnect, assemble, tighten, and/or disassemble the connector 100.

Figure 4:
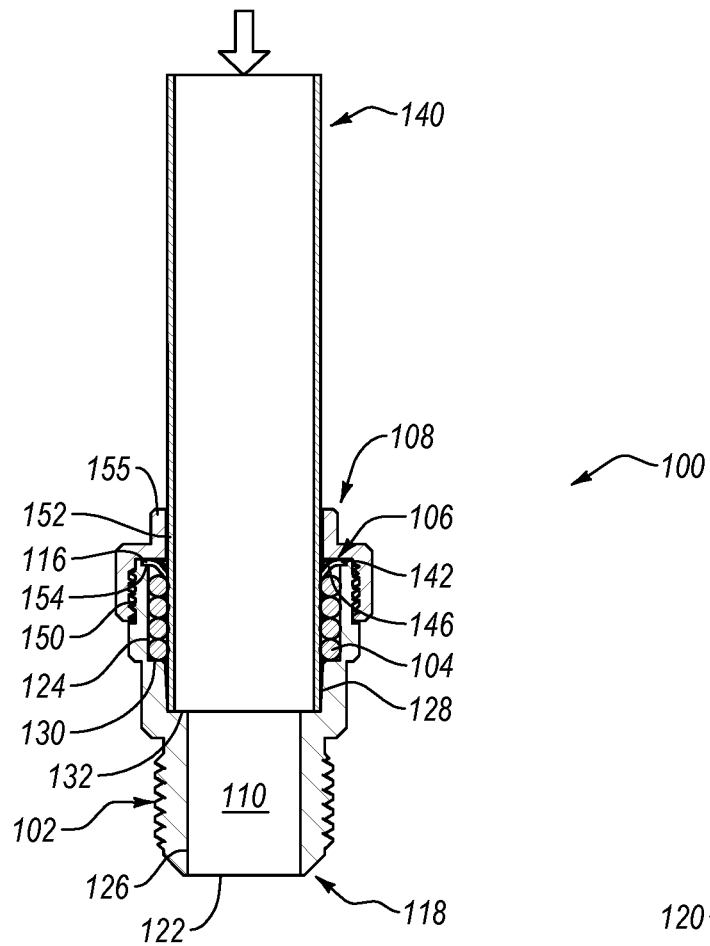
FIG. 4 is a cross-section view of the assembly shown in FIG. 2 taken along line 4-4.
Figure 5:
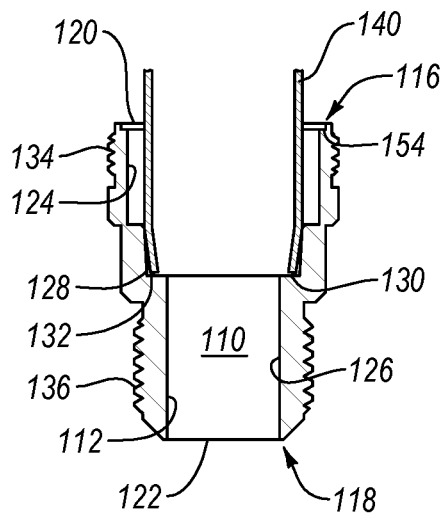
FIG. 5 is a detailed cross-section view of the housing body shown in FIG. 2, with a pipe inserted in the bore of the housing body.
Figure 6:
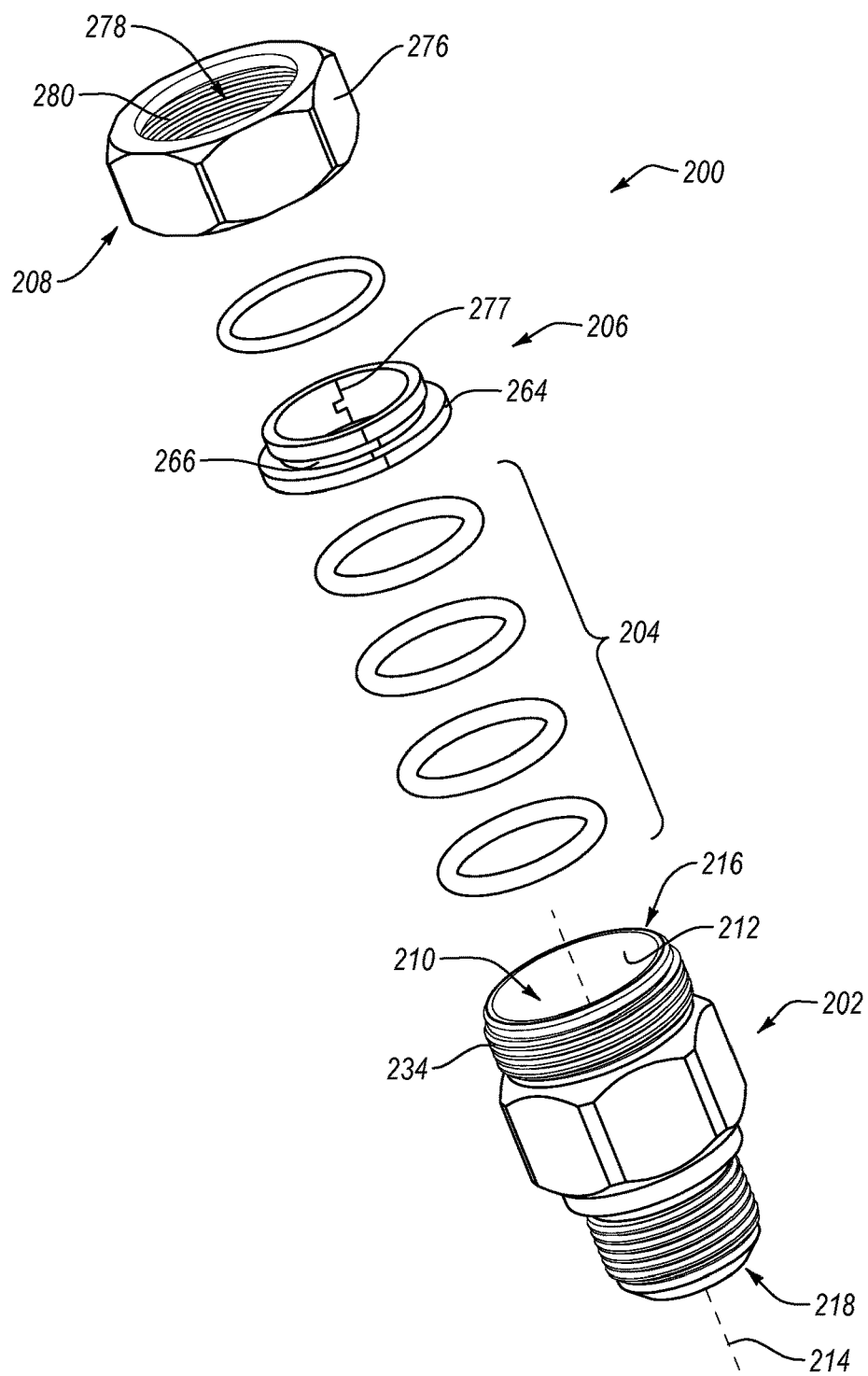
FIG. 6 is an exploded perspective view of a pipe connector according to another embodiment.

Referring now to FIGS. 4 and 5, the axial bore 110 includes an upper bore area 124 located toward the housing top 116, a lower bore area 126 located towards the housing bottom 118, and intermediate bore area 128 in between the upper bore area 124 and the lower bore area 126. The upper bore area 124, the lower bore area 126, and the intermediate bore area 128 can be concentric with the bore central axis 114. The lower bore area 126 can have a smaller diameter than the intermediate bore area 128. The intermediate bore area 128 can have a smaller diameter than the upper bore area 124.

The upper bore area 124 can terminate at an upper radial shoulder or abutment 130. The intermediate bore area 128 can terminate at a lower radial shoulder or abutment 132. The upper abutment 130 can optionally include a chamfered edge, facilitating insertion of the pipe as described below. The top opening 120 of the axial bore 110 includes an undercut recess that terminates at a top radial shoulder or abutment 154.

The sealing members 104 can be positioned in the axial bore 110. The sealing members 104 can be situated in the upper bore area 124 and supported therein by the upper abutment 130. The sealing members 104 can comprise a plurality of o-rings, each defining a through opening dimensioned to receive a portion or a length of a refrigerant pipe 140 when the connector 100 is to be used, as will be discussed in more detail below.

The sealing members 104 can be arranged in a stacked configuration and configured to resiliently compress between the bore wall 112 and the refrigerant pipe 140 when the refrigerant pipe 140 is inserted into the axial bore 110. This can form a seal between the refrigerant pipe 140 and the housing body 102, reducing the likelihood of leakage through the connector 100.

The sealing members 104 can also reduce the effusion of refrigerant through the connector 100 to the environment. Effusion is the process in which a gas (e.g., Freon) escapes through a small hole. This occurs if the diameter of the hole is considerably smaller than the mean free path of the molecules. It is common to have refrigerant in a refrigeration system matriculate through a gasket or porous member within a refrigeration system. For instance, over time molecules of refrigerant may slowly move through pores in the body of a sealing member within a conventional connector.

Because the connector 100 includes a plurality of sealing members 104 in series or in a stacked configuration within the axial bore 110, the sealing members 104 substantially reduce the likelihood of refrigerant escaping to the environment by forming multiple barriers or levels through which the refrigerant must pass to escape the connector 100. This advantageously can increase the efficiency of a system within which the connector 100 is being used and is more environmentally friendly.

As seen the sealing members 104 may be situated closely side-by-side so as to touch each other. The sealing members 104 may be situated in such a way that some of the sealing members 104 are spaced from one another and others are contacting one another. The sealing members 104 may be arranged such that all of the sealing members 104 are spaced apart from one another.

The sealing members 104 can include any suitable material. For instance, the sealing members 104 can include rubber, synthetic rubber, polymers, elastomeric materials, soft metals, resins, combinations thereof, or any other suitable material. The constructions of the sealing members 104 may be dependent on a number of different factors, such as the anticipated size of the pipe, the type of connection to be made, an anticipated operating pressure, fluid type, user preference, safety standards, and/or other factors. The sealing members 104 can include two, three, five, six, or any other suitable number of sealing members 104.

The locking member 106 can be positioned above the sealing members 104 within the axial bore 110. The locking member 106 can be dimensioned to receive a portion of a length of the refrigerant pipe 140 when the connector 100 is to be used.

As best shown in FIG. 1, the locking member 106 can include an annular ring 142 and locking features 144 that, with the refrigerant pipe 140 fully received in the axial bore 110 cooperate with the refrigerant pipe 140 so as to function as a one-way stop. The ring 142 of the locking member 106 can be positioned on the top abutment 154.

The locking features 144 in the exemplary embodiment illustrated comprise teeth 146 extending away from the ring 142 and terminating at ends 148 that engage the outer diameter of the refrigerant pipe 140 to form a one-way stop when the refrigerant pipe 140 is fully received in the axial bore 110. The teeth 146 can be angled radially inward and downward from the ring 142 into the upper bore area 124. The teeth 146 can be arranged in a generally frusto-conical array with a narrower end of the frustum of the cone facing the intermediate bore area 128.

The teeth 146 can be deformable, bendable and/or flexible and may deform, pivot or flex radially or inwardly during use of the connector 100 when the refrigerant pipe 140 is inserted into the axial bore 110. The teeth 146 may comprise one, two, four, ten, twenty, or any other suitable number of teeth. The ends 148 of the teeth 146 when engaged with the refrigerant pipe 140 will restrict translation of the refrigerant pipe 140 relative to the axial bore 110 when the pipe is moved in any direction tending to remove the refrigerant pipe 140 from the axial bore 110. The end 148 of one or more of the teeth 146 can include a sharpened edge and/or point. The locking member 106 can be formed of any suitable material. The teeth 146 can be formed from a material this is deformable and harder than the refrigerant pipe 140.

The retaining member 108 can be attached to the housing top 116 and arranged to selectively retain the sealing members 104 and the locking member 106 in the axial bore 110. The retaining member 108 can include an internally threaded portion 150 arranged to threadedly connect to the upper threaded portion 134 of the housing body 102. Thus, the retaining member 108 can be placed over the housing top 116, and threaded onto or unthreaded from the housing body 102. This arrangement allows access to the locking member 106 and/or the sealing members 104 within the axial bore 110 by removing the retaining member 108 from the housing top 116, which, in turn, allows the locking member 106 and/or the sealing members 104 to be customized, replaced, and/or inspected. The retaining member 108 has an exemplary manipulating feature comprising wrench flats to enable rotation of the retaining member 108.

The retaining member 108 can define a central opening 152 concentric with the axial bore 110. The central opening 152 can be arranged to receive a portion of the free end area of the refrigerant pipe 140.

The retaining member 108 can include a pipe alignment feature comprising an annular guide 155 surrounding the central opening 152 and extending axially away from the top of the retaining member 108. The annular guide 155 can help limit unwanted movement of the refrigerant pipe 140 by directing the refrigerant pipe 140 being inserted into the axial bore 110 in an axial direction. If the refrigerant pipe 140 is attempted to be inserted out of this axial direction through the connector 100, difficulties can arise in properly connecting the connector 100 to the refrigerant pipe 140. The annular guide 155 provides a guide to keep the refrigerant pipe 140 substantially aligned in the axial direction, making the connector 100 easier to install.

Referring to FIGS. 4 and 5, a person or end user installing the connector 100 will insert a portion of the free end area of the refrigerant pipe 140 into the axial bore 110 via the central opening 152 in the retaining member 108. The central opening 152 can centralize the movement of the refrigerant pipe 140 with respect to the bore central axis 114 and the annular guide 155 can direct the refrigerant pipe 140 in the axial direction. As the refrigerant pipe 140 moves into the axial bore 110, the refrigerant pipe 140 reaches and slides through the locking member 106, towards the bottom opening 122 of the housing body 102. The refrigerant pipe 140 then can continue to advance through the axial bore 110, where the refrigerant pipe 140 passes through and compresses the sealing members 104 between the refrigerant pipe 140 and the bore wall 112, forming a substantially fluid-tight seal between the refrigerant pipe 140 and the sealing members 104.

The refrigerant pipe 140 can advance through the axial bore 110 until the end of the refrigerant pipe 140 reaches or substantially reaches the lower abutment 132. The lower abutment 132 can provide a stop or limit movement of the pipe within the axial bore. The lower abutment 132 can offer an index or indictor so that the person installing the connector 100 can tell whether the pipe as has been fully or properly inserted into the axial bore 110 when using the connector 100.

As best shown in FIG. 5, the diameter of the intermediate bore area 128 can be generally conical or tapered such that the further the refrigerant pipe 140 is inserted into the axial bore 110, the tighter the fit between the bore wall 112 and the refrigerant pipe 140. The taper of the intermediate bore area 128 can further allow the axial bore 110 to better accommodate the end of a refrigerant or line set pipe which has been cut. This is beneficial because oftentimes in refrigeration practice the refrigeration pipe is a softer metal pipe, allowing the installer to more easily manipulate the pipe in desired locations. Because of the softer nature of the pipe, the end of the pipe often has a slight taper or necking where the installer applied pressure on the pipe with a cutting tool while cutting the pipe. The taper of the intermediate bore area 128 defines a fit that better corresponds to such necking of the pipe than a cylindrical bore as in the prior art.

Moreover, because the diameter of the cut end of the pipe varies from cut to cut or from pipe to pipe, the taper of the intermediate bore area 128 can better accommodate the pipe by connecting a wider range of sizes and shapes of the pipe end.

With the end of the refrigerant pipe 140 positioned on the lower abutment 132, any axial movement of the refrigerant pipe 140 tending to withdraw the refrigerant pipe 140 from the axial bore 110, will result in the teeth 146 biting or engaging the external surface of the refrigerant pipe 140 to effectively lock the refrigerant pipe 140 in the axial bore 110. For instance, axial movement of the refrigerant pipe 140 tending to withdraw the refrigerant pipe 140 from the axial bore 110, can cause the teeth 146 of the locking member 106 to bend upward and toward the apex or annular ring 142 of the locking member 106. By so doing, the refrigerant pipe 140 pushes the teeth 146 radially outward, which, in turn, forces the outer diameter of the locking member 106 to expand radially.

As the outer diameter of the locking member 106 increases, the locking member 106 can become wedged between the refrigerant pipe 140 and the housing body 102, forcing the teeth 146 to become even more engaged with the refrigerant pipe 140.

This arrangement allows the connector 100 to be securely attached to the refrigerant pipe 140 without the need of soldering as in the prior art, substantially improving the safety and amount of time required to connect the connector 100. Further, the strength of the connection between the refrigerant pipe 140 and the locking member 106 can increase with any backward movement of the refrigerant pipe 140 within the connector 100. It will be appreciated that the described method of the installing the fitting 100 is exemplary only, as a number of different steps are possible.

The connector 100 can optionally include a release mechanism for disengaging the teeth 146 from the refrigerant pipe 140. The locking member 106 can include a segmented configuration such that the locking member 106 can be split into two and more segments and manually removed from the housing body 102 and the refrigerant pipe 140. Alternatively, the release mechanism can comprise a release ring.

A second exemplary embodiment of a pipe connector comprising a swage connector 200 is shown in FIGS. 6-9.

The swage connector 200 is arranged to connect a swaged pipe to a fitting, a valve, a regulator, another pipe, or any other suitable component. A swaged pipe includes a swaged end section where the pipe tapers out, necks out, or flares out from a first diameter to a wider second diameter. As shown, the swage connector 200 can include a housing body 202, sealing members 204, a locking member 206, and a retaining member 208. It will be appreciated that the connector 200 can be similar to and can include many of the same or similar features as the connector 100 described above.

The housing body 202 can include an axial bore 210 having a peripheral internal bore wall 212 and a bore central axis 214. The axial bore 210 can have any desired shape. The housing body 202 can include a housing top 216 and a housing bottom 218.

The axial bore 210 can include an upper bore area 224 located toward the housing top 216, a lower bore area 226 located towards the housing bottom 218, and an intermediate bore area 228 in between the upper bore area 224 and the lower bore area 226. The lower bore area 226 can have a smaller diameter than the intermediate bore area 228. The intermediate bore area 228 can have a smaller diameter than the upper bore area 224. The upper bore area 224 can terminate at an upper radial shoulder or abutment 230. The intermediate bore area 228 can terminate at a lower radial shoulder or abutment 232.

The sealing members 204 can be situated in the upper bore area 224 and supported therein by the upper abutment 230. The sealing members 204 can comprise a plurality of o-rings, each defining a through opening. The size and inherent properties of the material of the sealing members 204 can allow the sealing members 204 to be stretched over a swaged end section 240A of the refrigerant pipe 240 such that the sealing members 204 can be positioned on the narrower length or non-swaged section 240B of the refrigerant pipe 240 following swaged end section 240A.

Similar to the sealing members 104, the sealing members 204 can be arranged in a stacked configuration and configured to resiliently compress between the bore wall 212 and the refrigerant pipe 240 when the refrigerant pipe 240 is inserted in the axial bore 210, forming a seal between the refrigerant pipe 240 and the housing body 202. As described above, this also can reduce the rate of effusion of refrigerant through the sealing members 204.

The locking member 206 can be positioned above the sealing members 204 and supported on the housing top 216. When the locking member 206 is positioned on the housing top 216, a portion of the bottom of the locking member 206 can engage the housing top 216 and a portion of the bottom of the locking member 206 can extend over the sealing members 204 in the axial bore 210.

As best shown in FIG. 9, the locking member 206 can comprise a collar exhibiting a cylindrical configuration having an outer surface 262, a lower radial flange 264, and a radial groove 266 formed in the outer surface 262 above the lower flange 264.

The locking member 206 can be segmented (e.g., split into two or more pieces). For instance, the locking member 206 can be split diametrically along a split line 277 with two semicircular halves that are detachably connected together around the non-swaged section 240B of the refrigerant pipe 240. The split line 277 can define locking segments, can be generally linear, can be curved, and/or can exhibit any other suitable configuration. The split line 277 can be the same or can be different on different sides of the locking member 206.

The halves of the locking member 206 can be detachably connected together by a segment coupling member or band member 260 selectively positionable in the radial groove 266. The band member 260 can be elastomeric or can include any suitable material. Alternatively, the segment coupling member 260 and/or the radial groove 266 can be omitted. For instances, the segments of the locking member 206 can be configured to snap or lock together around the refrigerant pipe 240.

When the locking member 206 is assembled, it can define a central opening 268. The central opening 268 can be dimensioned to surround the non-swaged section 240B of the refrigerant pipe 240 in such a way that the locking member 206 prevents the swaged end section 240A of the refrigerant pipe 240 from moving through the locking member 206, securing the refrigerant pipe 240 within the connector 200.

Like the locking member 106, the locking member 206 can include one or more additional locking features 244 that, with the refrigerant pipe 240 fully received in the axial bore 210, cooperate with the refrigerant pipe 240 so as to function as a one-way stop, helping to safely secure the refrigerant pipe 240 within the connector 200. The bottom area of the locking member 206 can define a locking edge or end 272 having a sharpened configuration. When the locking edge 272 is engaged with the refrigerant pipe 240 it forms a one-way stop. The locking edge 272 can engage the non-swaged section 240B and/or the swaged end section 240A of the refrigerant pipe 240. The locking edge 272 can be formed from a material that is harder than the refrigerant pipe 240.

The locking edge 272 can extend completely around the periphery of the locking member 106 or the locking edge 272 can extend around one or more portions of the periphery of the locking member 106. The locking edge 272 can comprise a single structure or a plurality of structures. The locking edge 272 can comprise a bevel or taper extending from the lower flange 264 toward a bottom diameter 270 of the central opening 268. The locking edge 272 can be angled radially inward from the bottom diameter of the central opening 268 toward a longitudinal axis of the locking member 206. The locking edge 272 can include a serrated edge.

Alternatively, the locking feature 244 can comprise an expandable portion of the locking member 206 that expands radially inward in response to a treatment, forming an interference fit between the locking member 206 and the refrigerant pipe 240. The expandable portion of the locking member 206 can be located toward the top, middle, and/or bottom of the locking member 206. The treatment can comprise the presence of refrigerant, a chemical treatment, an ultraviolet light treatment, a heat treatment, or any other suitable treatment.

While, the locking member 206 is described including two halves, the locking member 206 can be constructed as three, four, or any other suitable number of segments that may be joined around the refrigerant pipe 240. In other embodiments, the locking member 206 can include multiple rows of locking edges.

Referring again to FIG. 8, the retaining member 208 can be attached to the housing top 216 and arranged to selectively retain the locking member 206 over the axial bore 210. The retaining member 208 can have a cap-like configuration include a top wall 274 and a peripheral sidewall 276. The top wall 274 can define an opening 278 dimensioned to allow the non-swaged section 240B and the swaged end section 240A of the refrigerant pipe 240 to pass therethrough. The sidewall 276 of the retaining member 208 can include an internally threaded portion 250 arranged to threadedly connect to the upper threads 234 of the housing body 202.

The opening 278 (shown in FIG. 6) formed in the top wall 274 can be dimensioned such that when the retaining member 208 is attached to the housing body 202, the internal surface of the top wall 274 surrounding the opening 278 engages the lower flange 264 of the locking member 206. This allows the retaining member 208 to secure the locking member 206 between the retaining member 208 and the housing body 202.

In use, a person or end user installing the connector 200 can pass the swaged end section 240A and the non-swaged section 240B of the pipe through the opening 278 of the retaining member 208 while the retaining member 208 is detached from the housing body 202. The segments of the locking member 206 can then be connected together around the non-swaged section 240B of the pipe 240. After the retaining member 208 and the locking member 206 are positioned on the non-swaged section 240B of the pipe 240, the sealing members 204 removed from the housing body 202 are stretched over the swaged end section 240A and positioned on the pipe 240 between the retaining member 208 and the swaged end section 240A.

The swaged end section 240A and a portion of the non-swaged section 240B of the pipe can then be inserted through the axial bore 210 of the housing body 202. The refrigerant pipe 240 can move through the axial bore 210 until the end of the refrigerant pipe 240 reaches or substantially reaches the lower abutment 232. This can locate the sealing members 204 already positioned on the pipe 240 in the upper bore area 124 such that the sealing members 204 can form a seal between the pipe 240 and the housing body 202.

With the end of the refrigerant pipe 240 positioned on or near the lower abutment 232, the retaining member 208 can be threadedly connected to the upper threads 234 of the housing body 202, securing the lower flange 264 of the locking member 206 between the interior surface of the top wall 274 of the retaining member 208 and the housing top 216. As seen in FIG. 8, this arrangement advantageously allows the locking member 206 to effectively fill the gap created between the non-swaged section 240B of the pipe 240 and the opening 278 in the retaining member 208.

With the end of the refrigerant pipe 240 positioned on or near the lower abutment 232 and the retaining member 208 secured over the locking member 206 on the housing body 202, any axial movement of the refrigerant pipe 240 tending to withdraw the refrigerant pipe 240 from the axial bore 210 will result in the locking member 206 locking the refrigerant pipe 240 in the axial bore 210. Further, the locking edge 272 of the locking member 206 can engage the external surface of the refrigerant pipe 240, helping to prevent the refrigerant pipe 240 from backing out of the connector 200. This beneficially allows the connector 200 to be quickly and safely connected to the pipe without soldering or adhesives as in the prior art.

It will be appreciated that the described method of the installing the fitting 200 is exemplary only, as a number of different steps are possible. For instance, the locking member 206 can be coupled together around the non-swaged section 240B of the pipe 240 after the sealing members 204 are positioned on the pipe 204 and/or after the insertion of the pipe 240 into the axial bore 210.

Figure 10:
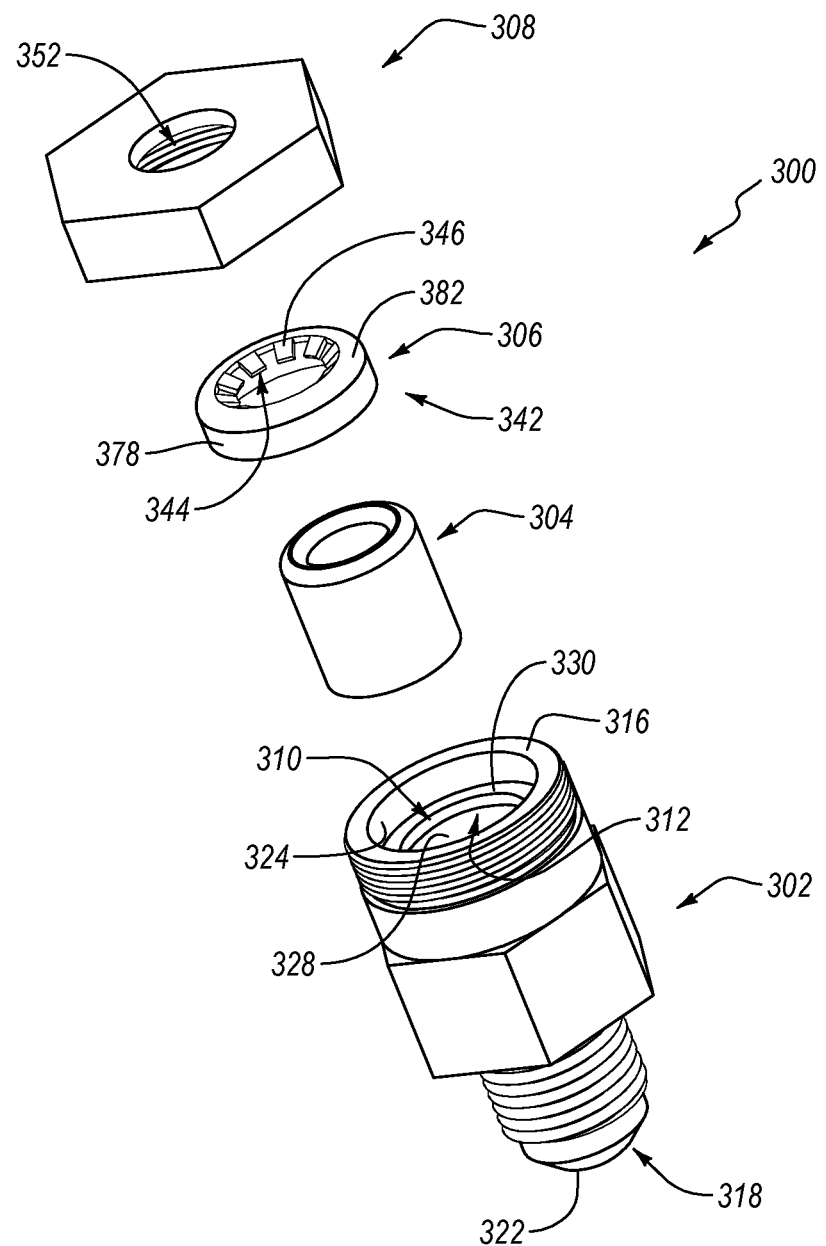
FIG. 10 is an exploded view of a pipe connector according to another embodiment.

A third exemplary embodiment of a pipe connector comprising a push connector 300 is shown in FIG. 10. The connector 300 can include a housing body 302, a sealing member 304, a locking member 306, and a retaining member 308. It will be appreciated that the connector 300 can be similar to and can include many of the same or similar features as the connectors described above.

The housing body can include an axial bore 310 having a peripheral internal bore wall 312 and a bore central axis. The axial bore 310 can have any desired shape. The housing body 302 can include a housing top 316 and a housing bottom 318.

The axial bore 310 can include an upper bore area 324 located toward the housing top 316, a lower bore area located toward the housing bottom 318, and an intermediate bore area 328 located between the upper bore area 324 and the lower bore area. The intermediate bore area 328 can have a smaller diameter than the upper bore area 324. The upper bore area 324 can terminate at an upper radial shoulder or abutment 330. The intermediate bore area 328 can terminate at a lower radial shoulder or abutment.

The sealing member 304 can be situated in the intermediate bore area 328 and supported therein by the lower abutment. The sealing member 304 can comprise an elongate, cylindrical tubular member and can include any suitable material. The sealing member 304 can have a height that is greater than about 0.8 times, about 1 times, about 1.2 times, or about 1.5 times an outer diameter of the sealing member 304. In other embodiments, the height of the sealing member may be greater or smaller relative to the outer diameter of the sealing member 304. The sealing member 304 can include at least one edge exhibiting a radius. The top opening of the sealing member 304 can be chamfered or may include a radius to facilitate insertion of the pipe into the sealing member 304.

When the end of a pipe is inserted in the axial bore 310, the sealing member 304 is configured to be radially compressed between the pipe and the bore wall 312 to provide a seal between the pipe and the housing body 302. The length of the sealing member 304 can help form the seal between the sealing member 304 and the pipe 340 by increasing the contact surface area between the sealing member 304 and the pipe 340. The diameter of the intermediate bore area 328 can be constant or variable. For instance, the diameter of the intermediate bore area 328 can be generally conical or tapered such that the further the pipe is inserted into the intermediate bore area 328, the greater the compression of the sealing member 304 between the pipe and the housing body 302.

The locking member 306 can be positioned above the sealing member 304 within the upper bore area 324. The locking member 306 can be supported within the upper bore area 324 by the upper abutment 330. The locking member 306 can include a ring member 342 having a cylindrical sidewall 378 extending axially along the bore central axis 314. The sidewall 378 can be substantially continuous or may include one or more cutouts or relieved portions. The sidewall 378 can have a height arranged to help brace the locking member 306 against the bore wall 312 in use. An annular rim 382 can extend radially inward from the sidewall 378. The rim 382 can exhibit a curved contour or any other suitable shape.

The locking member 306 can include one or more locking features 344. The locking feature 344 can comprise a plurality of teeth 346 angled radially inward and toward the intermediate bore area 328. The teeth 346 may be arranged in a generally frusto-conical array with the narrower end of the cone facing the intermediate bore area 328. The teeth 346 may form an angle between about 25 degrees and about 50 degrees, between about 30 degrees and about 47 degrees, or between about 35 degrees and about 40 degrees relative the rim 382. In other embodiments, the teeth 346 may form a larger or smaller angle relative to the rim 382. The teeth 346 can exhibit any suitable configuration. The free end or tip of at least one of the teeth 346 can include a sharpened edge and/or point.

The retaining member 308 can define a central opening 352 generally concentric with the axial bore 310. The central opening 352 can be arranged to receive a portion of the free end area of a pipe or refrigerant pipe.

With the pipe fully inserted in the axial bore 310, any axial movement of the pipe tending to remove the pipe from the connector 300, will cause the teeth 346 to bend upward toward the rim 382 of the locking member 306. By so doing, the pipe pushes the teeth 346 radially outward, which, in turn, forces the sidewall 378 of the locking member 306 to expand radially against the bore wall 312. The height of the sidewall 378 can increase the surface contact area between the locking member 306 and the bore wall 312, increasing the connection strength. As the sidewall 378 expands radially, the locking member 306 is arranged to become wedged between the pipe and the bore wall 312, causing the teeth 346 to become even more engaged with the pipe. This allows the connector 300 to be quickly and safety connected to the pipe without soldering or adhesives as in the prior art. Further, the strength of the connection between the pipe and the locking member 306 can increase with backward movement of the pipe within the connector 300.

Figure 11:
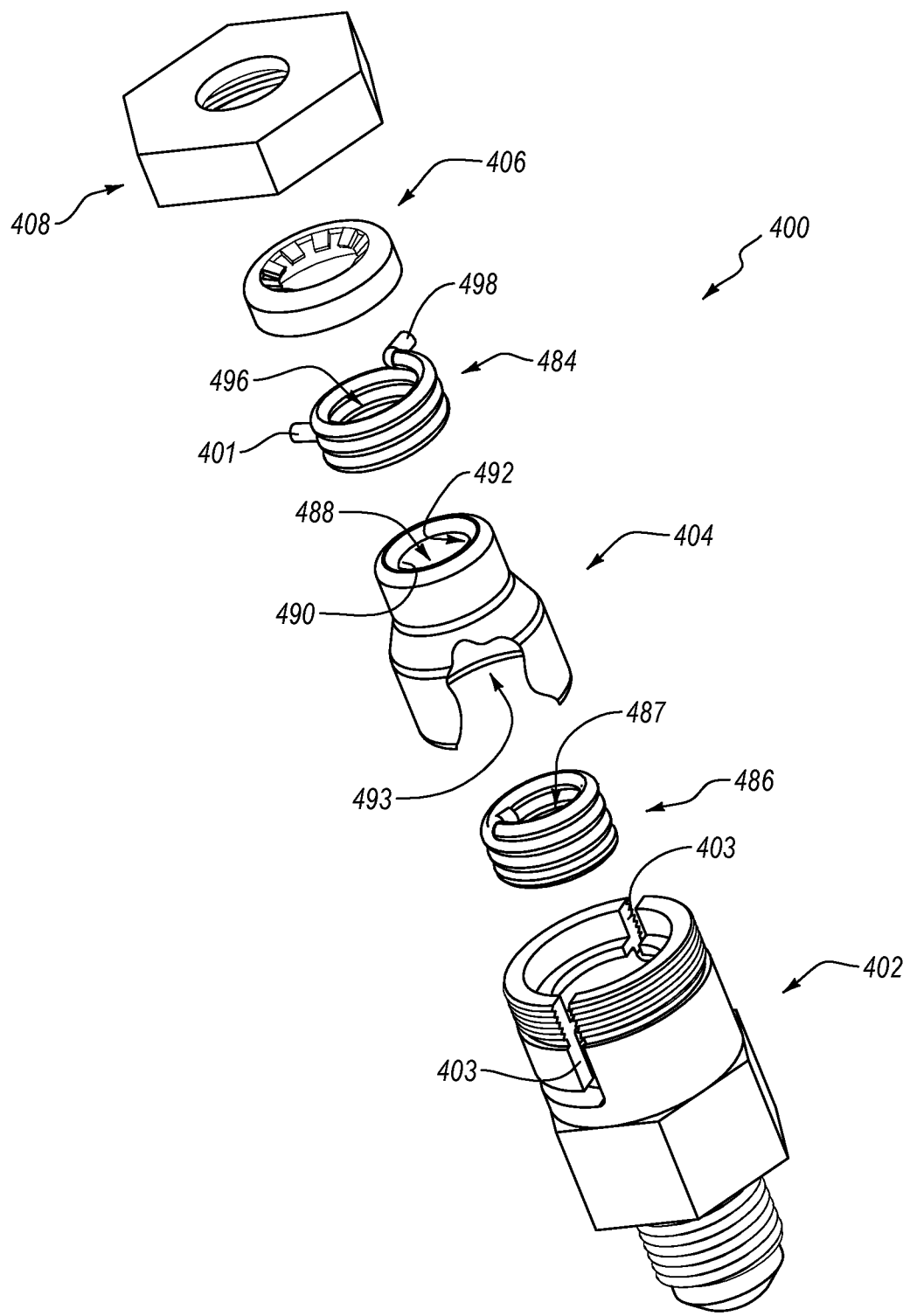
FIG. 11 is an exploded view of a pipe connector according to another embodiment.

A fourth exemplary embodiment of a pipe connector comprising a slip connector 400 is shown in FIG. 11. The connector 400 can include a housing body 402, a sealing member 404, a locking member 406, and a retaining member 408. It will be appreciated that the connector 400 can be similar to and can include many of the same or similar features as the connectors described above.

The sealing member 404 can include a through channel 488 having a peripheral internal channel wall 490 defining an upper channel area 492 and a lower channel area 493. The upper channel area 492 can have a smaller diameter than the lower channel area 493. The upper channel area 492 and the lower channel area 493 can be generally concentric with a central axis of the housing body 402.

The connector 400 can further include a contraction member 484 and an expansion member 486, both of which can enhance the seal formed by the sealing member 404.

The expansion member 486 can be positioned within the lower channel area 493 of the sealing member 404. The expansion member 486 is arranged to exert a radially outward force on the peripheral internal channel wall 490 so as to further compress the sealing member 404 against the peripheral internal bore wall 412 of the axial bore 410.

The expansion member 486 can exhibit any suitable configuration. The expansion member 486 can comprise a resilient member, a torsion spring, a coiled spring, a resilient clip, resilient clamp, a variable spring, a flat spring, a machined spring, a helical spring, or other suitable member. The expansion member 486 can define a central passageway 487 arranged to allow the pipe to pass therethrough. The expansion member 486 can include any suitable number of coils.

The expansion member 486 can include a lower arm and an upper arm. As the upper and lower arms are moved toward each other, the diameter of the expansion member 486 is decreased. This assists a user in inserting the expansion member 486 within the sealing member 404.

The contraction member 484 is positionable on the outer surface of the sealing member 404 toward the top of the sealing member 404. The contraction member 484 is arranged to apply a substantially constant radially inward force on the sealing member 404 such that the sealing member 404 compresses tighter against the pipe, enhancing the seal between the sealing member 404 and the pipe. The contraction member 484 can comprise a torsion spring, a coil spring, a resilient clip, a resilient clamp, a variable spring, a flat spring, a machined spring, a helical spring, or any other suitable member.

The contraction member 484 can define a central passageway 496 dimensioned to receive the portion of the sealing member 404 surrounding the upper channel area 492. The contraction member 484 can include a shorter arm 498 and a longer arm 401. The shorter arm 498 can engage the housing body 402. The longer arm 401 is arranged to allow the user to move the contraction member 484 between a loaded position and an unloaded position.

In the loaded position, the stored mechanical energy in the contraction member 484 can exert a radially inward force on the sealing member 404 to compress the sealing member 404 against the pipe. In the unloaded position, the stored mechanical energy is released such that the force exerted on the sealing member 404 by the contraction member 484 is substantially reduced and/or eliminated.

The housing body 402 can define slots 403 arranged to accommodate the arms 498, 401 as the contraction member 484 is moved between the loaded and unloaded position. The slots 403 can exhibit any suitable configuration.

Although a single locking member is described in the foregoing embodiments, other numbers of locking members are possible, including two, three, four, or any other suitable number. For instance, the connector 100 can be configured as a slip-slip connector arranged to be connected two lengths of unthreaded pipes together with a first locking member located toward the housing top and another locking member located toward the housing bottom.

While the foregoing housing body embodiments are shown including a cylindrical configuration, in other embodiments, the housing body can include a generally elliptical, generally triangular, generally square, generally rectangular, generally polygonal, other shapes having arcuate and/or linear portions, combinations thereof, or any other suitable configuration. While the axial bore is described including different diameters and/or abutments, it will be appreciated that in other embodiments the axial bore can have a constant diameter and/or can exhibit any suitable configuration. While the central openings are described as being centrally located, in other embodiments, the central openings can be non-central or located toward one side or another of the member.

It will be appreciated that the connector can exhibit any suitable configuration. For instance, the connector can be configured as a tee, a union, a coupling, an elbow, or any other suitable type of connector. The connector may be a stand-alone component or may be integral with or attached to other components, such as, for example, a valve, a tank, a regulator, or any other suitable device.

Refrigerant Systems

Figure 12:
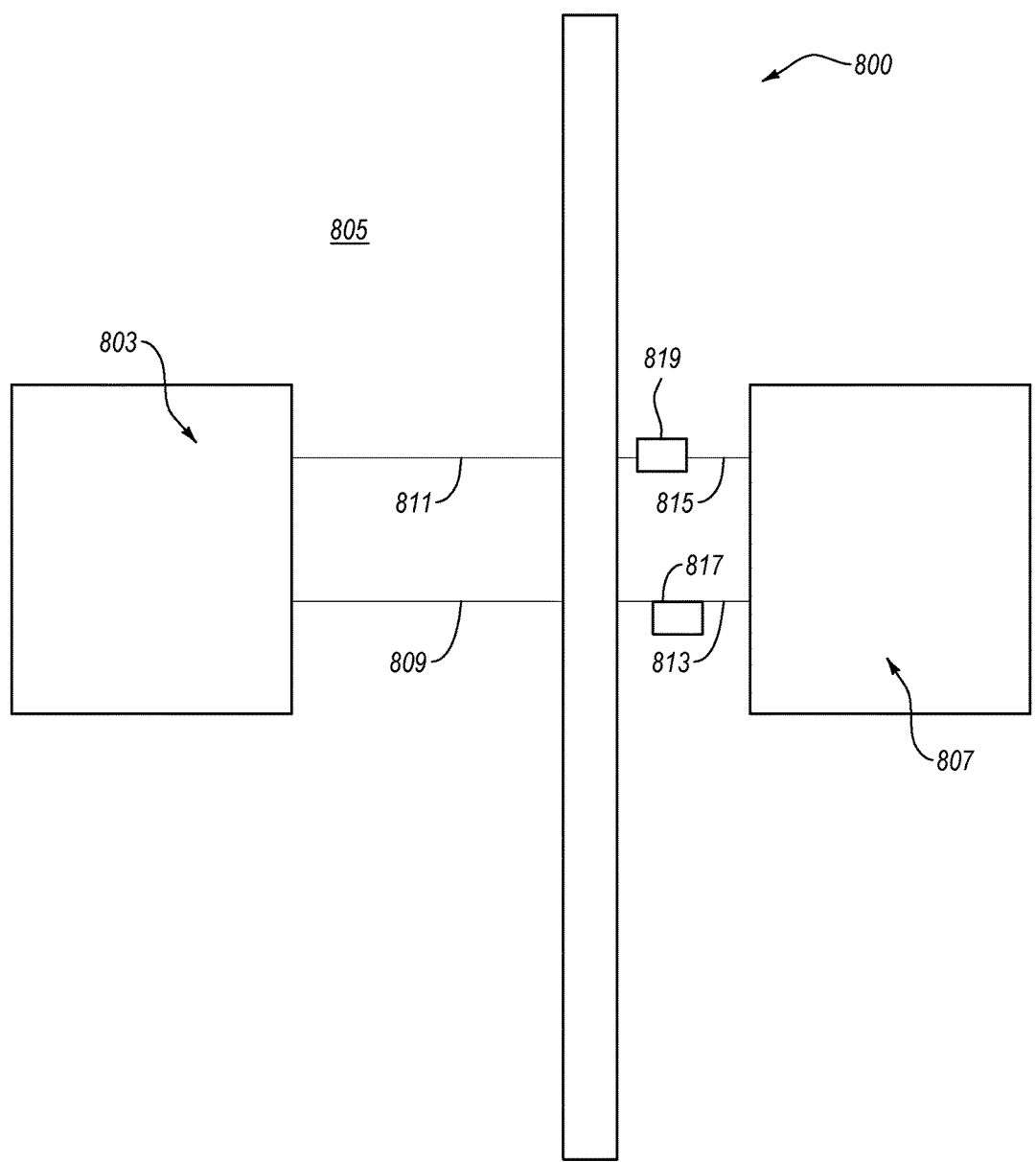
FIG. 12 is a simplified schematic illustration of a refrigeration system utilizing any of the pipe connectors disclosed herein.

An exemplary refrigeration or air conditioning system 800 utilizing any of the connectors disclosed herein is illustrated in FIG. 12. The air conditioning system 800 can include an indoor unit 803 located inside of a building 805 and an outdoor unit 807 located outside of the building 805.

A first pipe 809 arranged to convey gaseous refrigerant and a second pipe 811 arranged to convey liquid refrigerant can be connected to the indoor unit 803. The first and second pipes 809, 811 can extend from the indoor unit 803 through the wall of the building 805. A third pipe 813 arranged to convey gaseous refrigerant and a fourth pipe 815 arranged to convey liquid refrigerant can be connected to the outdoor unit 807.

The first pipe 809 can be fluidly connected to the third pipe 813 via a first connector 817 and the second pipe 811 and the fourth pipe 815 can be fluidly connected together via the second connector 819. The connectors 817, 819 can be any of the connectors disclosed herein. This advantageously allows the outdoor unit 807 to be operatively connected to the indoor unit 803 in a less hazardous and efficient manner. For example, the outdoor unit 807 can be operatively connected to the indoor unit 803 without having to use a soldering gun to solder the respective lengths of the pipes together next to the wall of the building 805.

Moreover, the construction of the connectors 817, 819 can be configured to account for a number of different factors, such as the sizes of the liquid and gaseous refrigerant lines, the anticipated operating temperature of the air conditioning system 800, and/or other factors. Further, the system 800 may include the use/installation of a plurality of connectors. For example, a connector may be used to connect the gaseous refrigerant pipe to the indoor unit 803 and another connector to connect the same gaseous refrigerant pipe to the outdoor unit 807.

The same principles can apply to the liquid refrigerant line. For instance, a connector may be used to connect the liquid refrigerant line to the indoor unit 803 and another connector may be used to connect the same liquid refrigerant line to the outdoor unit 807. It will be appreciated that each refrigerant line (liquid or gaseous) may include the use of one, two, three, five, or any other suitable number of connectors throughout as installation may require.

While the connectors are illustrated connecting copper pipes of an air conditioning system, it will be appreciated that the connectors can be utilized in any number of different applications and with a variety of different types of pipes. For example, pipe connectors may be attachable to air conditioning units, evaporative coil units, or other such utility units. These and other suitable types of units to which the pipe connectors may be attached may be generically referred to herein as "utility units."

Flexible Connection Assemblies

In some embodiments, a pipe connector may be coupled to a section of flexible hose or flexible pipe in order to form a flexible connection assembly. In some embodiments, a flexible connection assembly is attachable to a utility unit requiring a pipe-to-pipe connection, such as a utility unit having one or more swaged connections. For example, an embodiment of a flexible connection assembly may include a pipe connector as illustrated in FIGS. 6-9, allowing connection of the flexible connection assembly to a swaged pipe, such as a swaged pipe connection of an air conditioning unit or other utility unit.

Additionally, or alternatively, a flexible connection assembly may be attachable to a non-swaged pipe. For example, an embodiment of a flexible connection assembly may include a pipe connector as illustrated in FIGS. 1-5, allowing connection of the flexible connection assembly to a non-swaged pipe, such as a refrigerant line leading into a house or other building, or other type of pipe end suitable for connection.

Some flexible connection assembly embodiments include a first pipe connector coupled to the flexible hose at a first end of the flexible hose, and a second pipe connector coupled to the flexible hose at a second end of the flexible hose. For example, a flexible connection assembly may include a first pipe connector of a first type on one end of the hose, and a second pipe connector of a second type on the other end of the hose.

By way of example, a flexible connection assembly may have a first pipe connector configured for coupling to a swaged pipe, and a second pipe connector configured for coupling to a non-swaged pipe. As described in more detail below, such an embodiment may be particularly useful in implementations requiring connection between a utility unit having one or more swaged fittings and a set of corresponding pipes (e.g., refrigerant lines).

Although many of the flexible connection assembly embodiments described herein include particular embodiments of pipe connectors, alternative embodiments may include flexible hoses coupled to any of the different pipe connectors described herein, including pipe connectors that combine different elements and components of the illustrated pipe connectors. In some embodiments, flexible connection assemblies include a flexible hose coupled to one pipe connector (e.g., with the opposite end of the flexible hose omitting a pipe connector). Alternatively, some embodiments include a flexible hose coupled to a plurality of pipe connectors (e.g., one on each end of the flexible hose), which may be of the same or different type.

Flexible pipes included in the flexible connection assemblies may be formed from rubber or other natural and/or synthetic polymer materials, metal materials (e.g., stainless steel, copper, aluminum, and/or other metals or alloys), fibers (e.g., carbon fiber materials), resin, or composites/combinations thereof. Flexible pipes may be formed with a corrugated construction, helical construction, and/or braided construction (e.g., wire braid, tape braid, twilled braid, etc.). Some embodiments of flexible pipes may have an interior section surrounded by one or more outer shell sections, such as an interior section surrounded by one or more layers of braided material and/or helically wound material.

Figure 13:
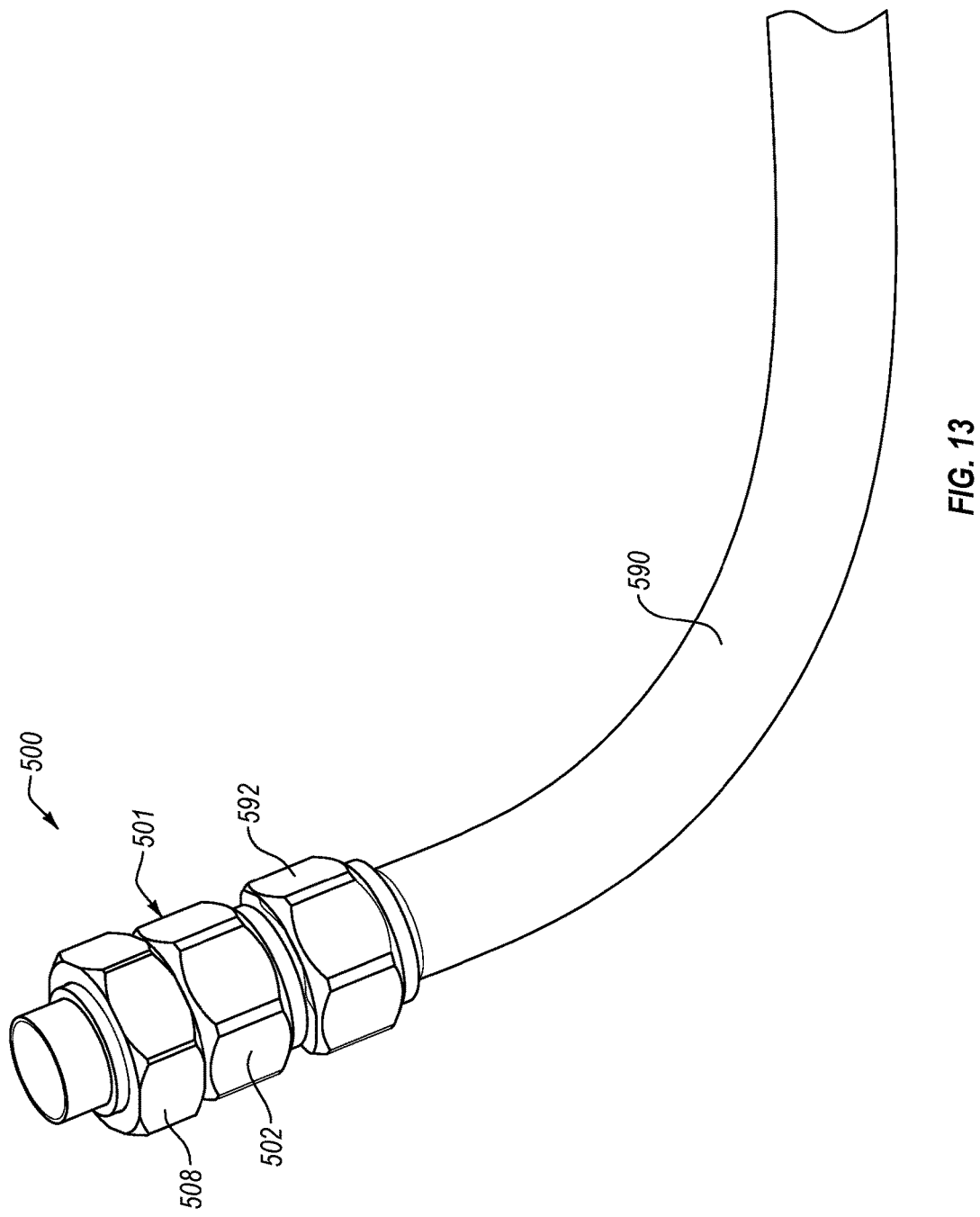
FIG. 13 is a view of a flexible connection assembly, including the pipe connector shown in FIG. 6 coupled to a section of flexible hose.

FIG. 13 illustrates an exemplary embodiment of a flexible connection assembly 500, including a pipe connector 501 connected to a flexible hose 590. As shown, the flexible hose 590 may include an attachment piece 592 enabling attachment of the hose 590 to the pipe connector 501. For example, the attachment piece 592 can connect to the housing bottom (not shown) and/or a lower threaded portion (not shown) of the pipe connector 501 through matching threads, a clamping mechanism, push-fit action, lever coupling, and/or other hose attachment means.

In the illustrated embodiment, the pipe connector 501 may be used to connect the flexible connection assembly to a pipe, such as a pipe having a swaged end or a swaged pipe connection of a utility unit. Accordingly, the illustrated pipe connector 501 may be similar to the pipe connector illustrated in FIGS. 6-9, and may include a housing body 502, sealing members (not shown), one or more locking members (not shown), and a retaining member 508.

Figure 14:
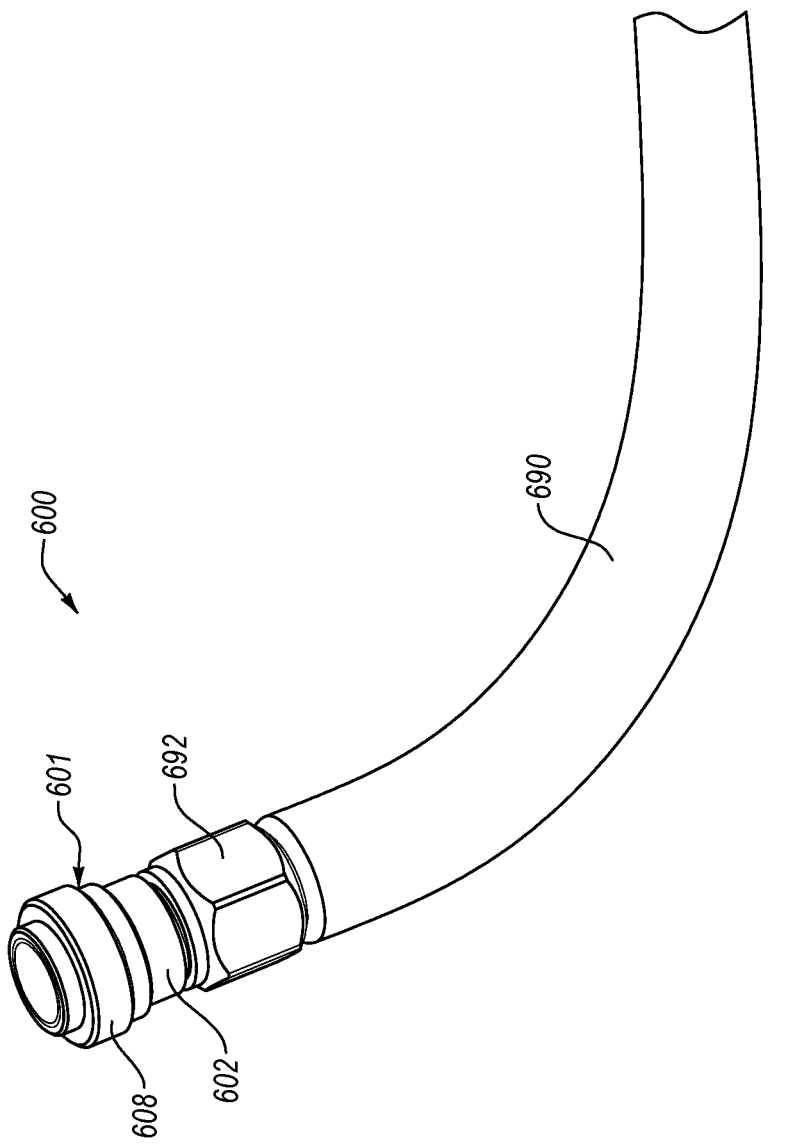
FIG. 14 is a view of a flexible connection assembly, including the pipe connector shown in FIG. 1 coupled to a section of flexible hose.

FIG. 14 illustrates another exemplary embodiment of a flexible connection assembly 600, including a pipe connector 601 connected to a flexible hose 690. As shown, the flexible hose 690 may include an attachment piece 692 enabling attachment of the hose 690 to the pipe connector 601. For example, the attachment piece 692 can connect to the housing bottom (not shown) of the pipe connector 601 through matching threads, a clamping mechanism, push-fit action, lever coupling, and/or other hose attachment means.

In the illustrated embodiment, the pipe connector 601 may be used to connect the flexible connection assembly to a non-swaged pipe, such as a pipe having a non-swaged end and/or cut end. The illustrated pipe connector 601 may be similar to the pipe connector illustrated in FIGS. 1-5, and may include a housing body 602, sealing members (not shown), one or more locking members (not shown), and a retaining member 608.

Figure 15:
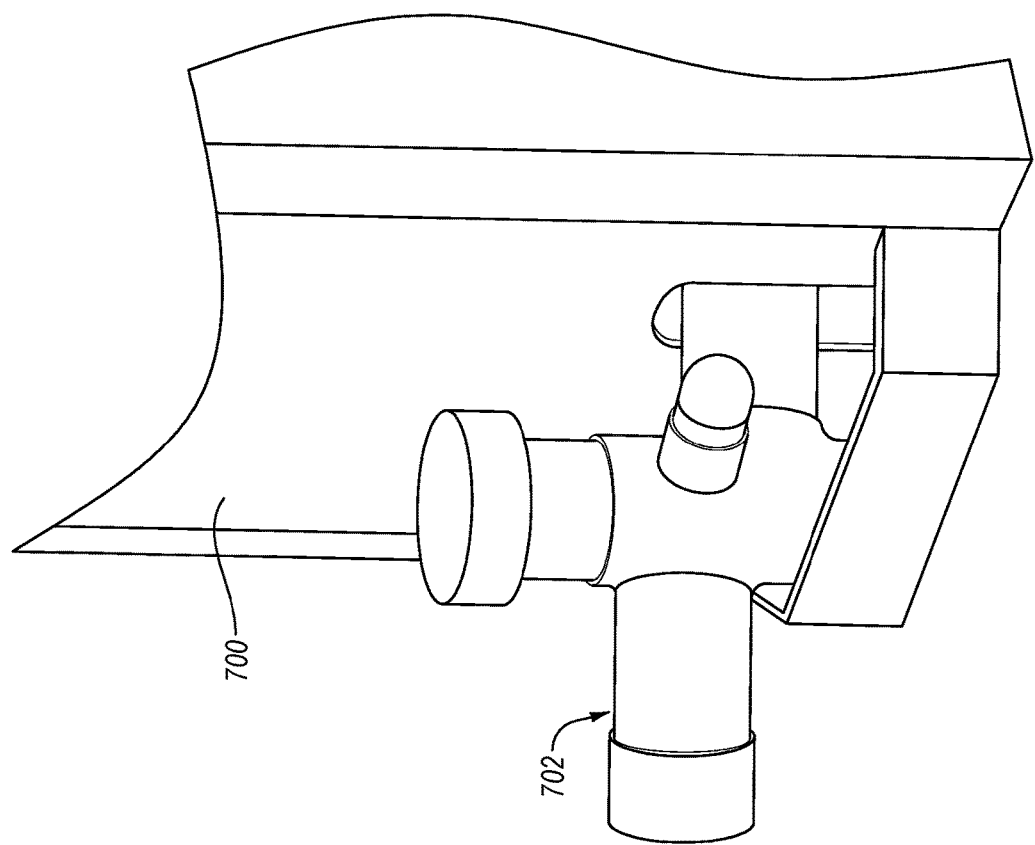
FIG. 15 is a view of a utility unit, showing a swaged fitting of the utility unit.

Flexible connection assemblies may be particularly beneficial for attaching to a utility unit, for example, as part of installing a utility unit for use at a home, building, or other operational site. FIG. 15 illustrates a utility unit 700 with a close up view of a swaged pipe fitting 702. Such swaged fittings 702 are common for air conditioning units, evaporative coil units, and other utility units. In order to install the utility unit, the proper piping must be attached to the utility unit at the swaged fitting 702. As described above, this typically requires soldering or brazing in tight spaces usually next to a home or building, increasing fire and other safety risks.

Figure 16:
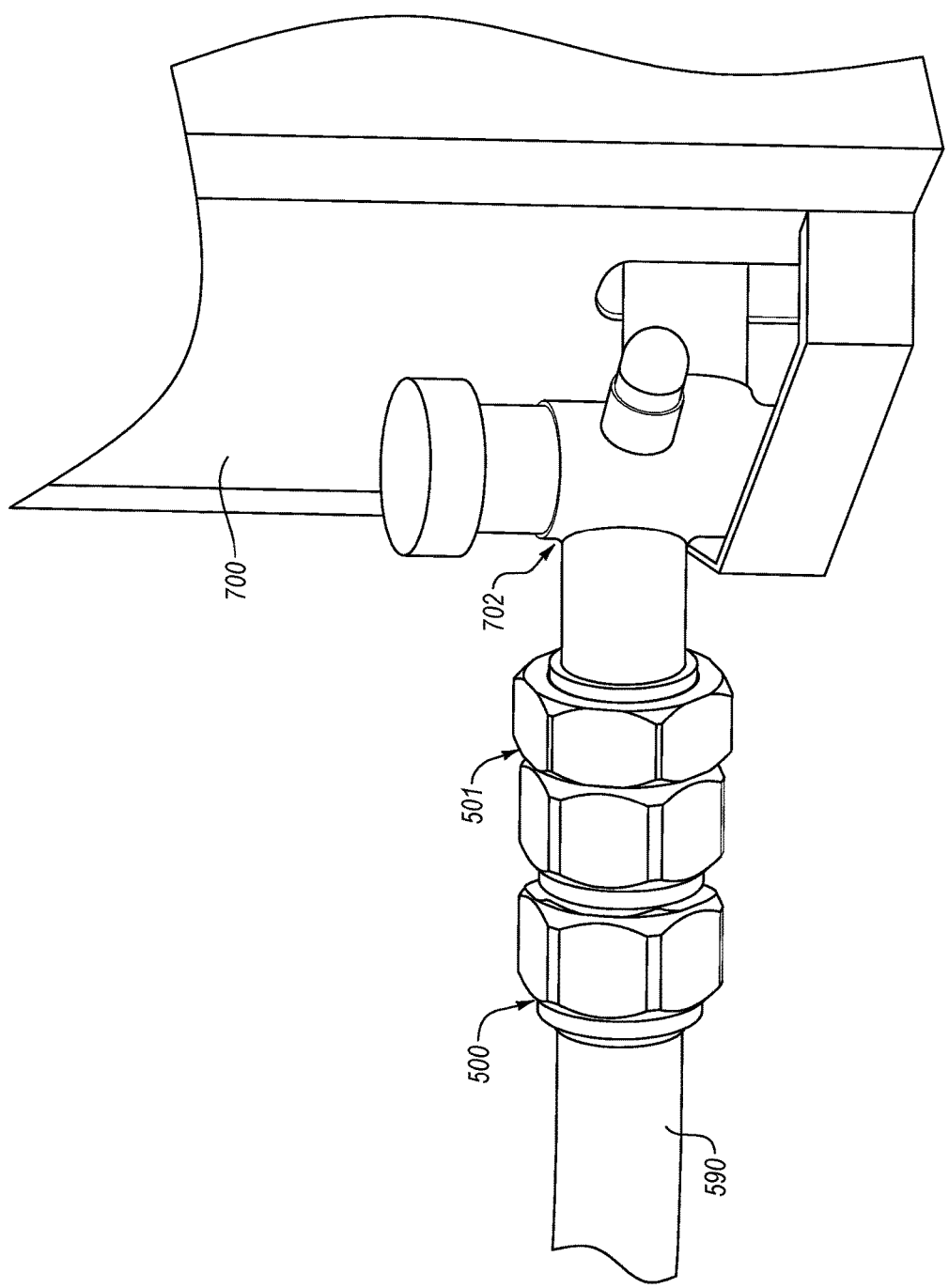
FIG. 16 is a view of the flexible connection assembly of FIG. 13 coupled to the swaged fitting of the utility unit.

FIG. 16 illustrates the utility unit 700 and swaged fitting 702 after a flexible connection member 500 has been coupled to the swaged fitting 702. As shown, the pipe connector 501 of the flexible connection member 500 may be coupled to the swaged fitting 702. As described above, the sealing members, one or more locking members, retaining member, and other components of the pipe connector 501 function to form a strong and easily applied connection between the pipe of the swaged fitting 702 and the flexible connection member 500.

In addition, the flexible hose 590 allows a user to quickly and effectively position the flexible connection assembly 500 as needed for a given installation operation. For example, the pipe connector 501 may be properly aligned to the swaged fitting 702 by flexing, bending, and/or twisting the flexible hose 590 accordingly. In contrast, a rigid pipe system must be soldered or brazed in place so as to directly align with the swage fitting, cut and fit with a number of elbows or other joints, and/or bent using various pipe bending tools and processes (with pipe bending typically being limited by the inherent properties of the rigid pipe).

Figure 17:
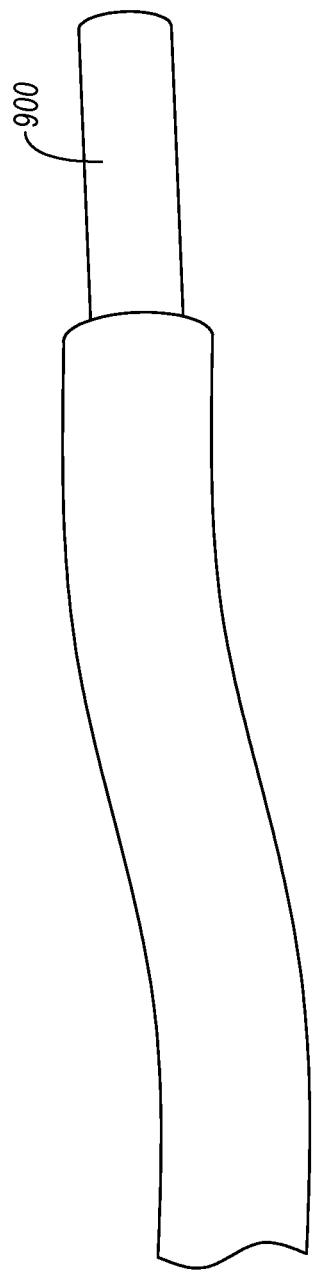
FIG. 17 is a view of a pipe end to which an attachment may be made.

FIG. 17 illustrates a pipe 900 to which a flexible connection assembly may be attached. The pipe 900 may be, for example a pipe leading from outdoors into a house or other building and into an indoor unit of a utility system (e.g., air conditioning system). Typically, refrigerant lines or other such pipes are directed from an inside unit toward the corresponding outside unit, where a series of soldering, brazing, pipe bending, cutting and joint fitting steps must be made to make the connection to the outside unit fittings.

Figure 18:
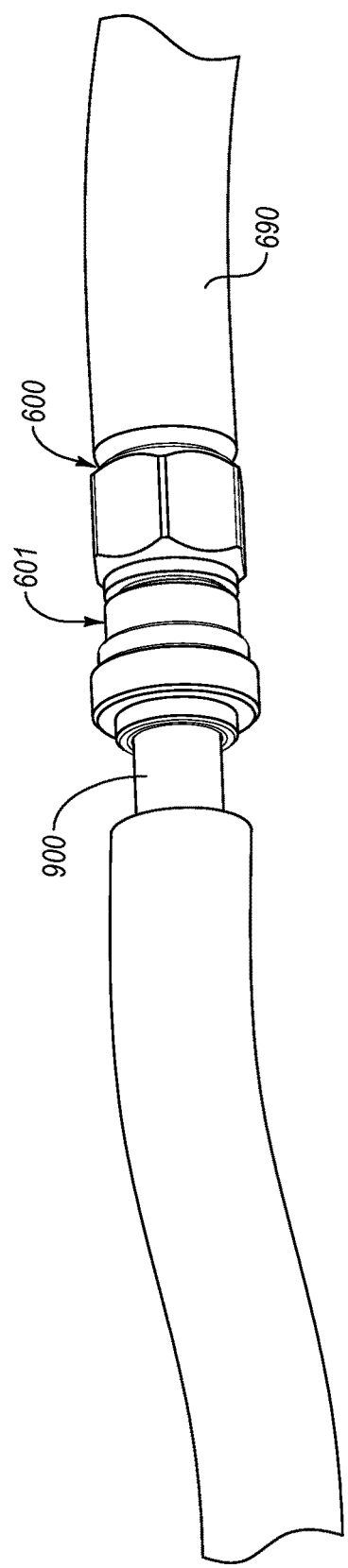
FIG. 18 is a view of the flexible connection assembly of FIG. 14 coupled to the pipe end.

FIG. 18 illustrates the pipe 900 coupled to the flexible connection assembly 600. As shown, the pipe connector 601 of the flexible connection assembly 600 is coupled to the pipe 900, connecting the flexible hose 690 to the pipe 900. The flexible connection assembly 600 beneficially enables quick and effective coupling to the pipe 900, reducing or eliminating the need for brazing/soldering operations and/or other difficult or time-consuming operations.

Figure 19:
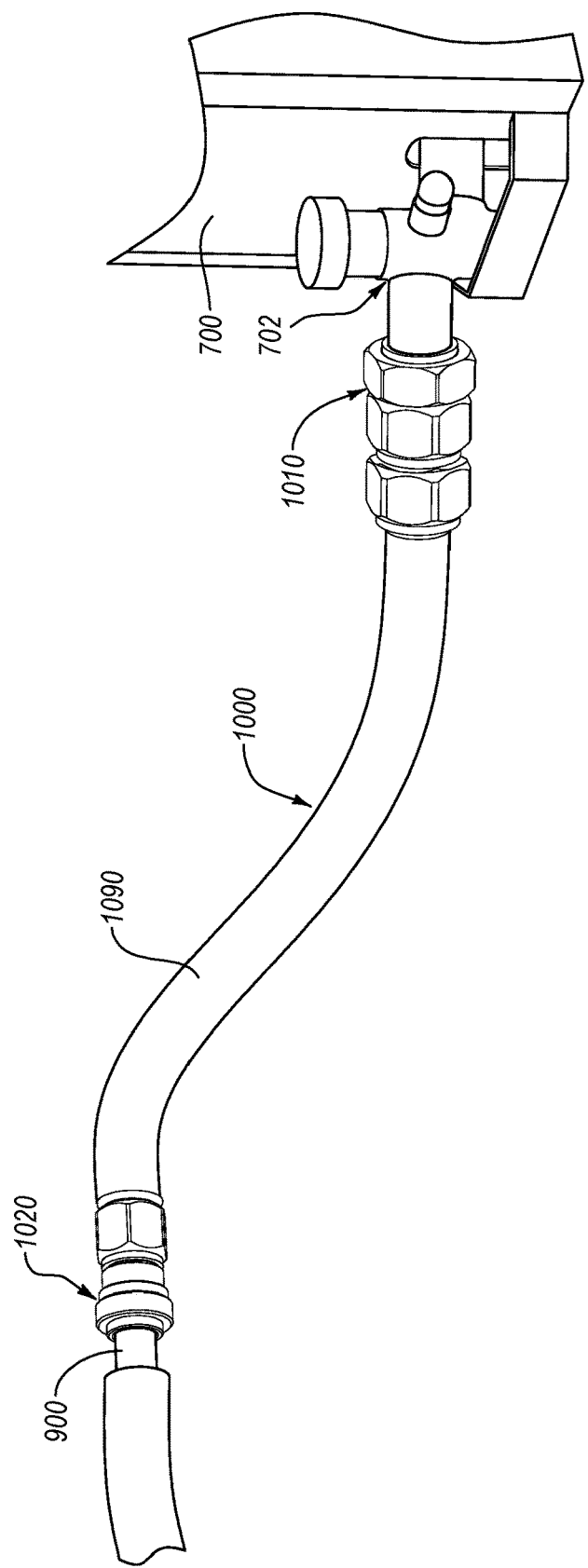
FIG. 19 is a view of a flexible connection assembly coupled between a pipe end and a utility unit.

FIG. 19 illustrates an implementation in which a flexible connection assembly 1000 is utilized between a pipe 900 and a utility unit 700. As shown, the flexible connection assembly 1000 can include a first pipe connector 1010 and a second pipe connector 1020. In the illustrated embodiment, the first pipe connector 1010 is configured for attachment to the swaged fitting 702 of the utility unit 700, and the second pipe connector 1020 is configured for attachment to the non-swaged end of the pipe 900. Such an embodiment may beneficially be used for quick and effective installation of a utility unit.

Further, the flexible hose 1090 provides resiliency to the installation from the effects of shifting of the utility unit 700 relative to other connection points. For example, shifting of a utility unit relative to a building wall to which the pipes of the utility unit are directed can cause damage to the pipes, fittings, and/or to the utility unit itself, particularly where rigid piping is used. Such shifting of the utility unit could be the result of small and incremental ground shifting or sinking, or could be the result of a more sudden event, such as an earthquake or the accidental backing of a vehicle into the utility unit. In circumstances such as these, a flexible connection assembly can beneficially adjust and compensate for the relative positional changes, thereby reducing the risk of equipment damage and the concomitant need for replacement and/or repairs.

Flexible hose sections included in flexible connection assembly embodiments may have a length configured to allow attachment between a utility unit and a nearby pipe end (e.g., leading into the interior of a building and/or to a corresponding indoor unit). For example, a length of about 0.5 to about 6 feet, about 1 to about 4 feet, or about 2 to about 3 feet.

Elements and components described in relation to any embodiment depicted and/or described herein may be combinable with elements described in relation to any other embodiment depicted and/or described herein. For example, any element described in relation to an embodiment depicted in FIGS. 1-5 may be combinable with an embodiment described in relation to an embodiment depicted in FIGS. 6-9, FIG. 10, or FIG. 11. In another example, any of the embodiments depicted in FIGS. 1-11, or combinations thereof, may be utilized in any of the embodiments of flexible connection assemblies described in relation to FIGS. 13-19.

The invention claimed is:

1. A pipe connector, comprising:
   a housing body defining an axial bore configured to receive a length of pipe, the length of pipe having at least a portion that is flexible and an enlarged end section having an enlarged diameter, the housing body having a first opening and a second opening opposite the first opening, the first opening configured to receive the length of pipe into the axial bore;
   a locking member defining a radial flange securable to the housing body outside of the axial bore, the locking member split into two or more segments selectively connectable together around the length of pipe and sized and configured to lock the enlarged end section of the length of pipe within the axial bore when the locking member is secured to the housing body, wherein the locking member includes a segment coupling member arranged to detachably secure the two or more segments together outside the axial bore and on a housing top of the housing body;
   at least one sealing member positionable around the length of pipe between the enlarged end section and the locking member, the at least one sealing member arranged to compress against and between the enlarged end section and the locking member; and
   a retaining member attachable to the housing body and defining an opening sized and configured to allow the enlarged end section of the length of pipe to pass therethrough, the retaining member being arranged to secure the locking member to the housing body.

2. A flexible connection assembly, comprising:
   a first pipe connector, the first pipe connector including:
      a housing body defining an axial bore configured to receive a length of pipe, the housing body having a first opening and a second opening opposite the first opening, the first opening configured to receive the length of pipe into the axial bore, the length of pipe including an enlarged end section having an enlarged diameter;
      a locking member defining a radial flange securable to the housing body outside of the axial bore, the locking member split into two or more segments selectively connectable together around the length of pipe and sized and configured to lock the enlarged end section of the length of pipe within the axial bore when the locking member is secured to the housing body, wherein the locking member includes a segment coupling member arranged to detachably secure the two or more segments together outside the axial bore and on a housing top of the housing body;
      at least one sealing member positionable around the length of pipe between the enlarged end section of the length of pipe and the locking member, the at least one sealing member arranged to compress against and between the enlarged end section and the locking member; and
      a retaining member attachable to the housing body and defining an opening sized and configured to allow the enlarged diameter of the enlarged end section to pass therethrough, the retaining member being arranged to secure the locking member to the housing body; and
   a section of flexible hose having a first end and a second end, the first end being coupled to the first pipe connector at the second opening of the housing body.

3. The flexible connection assembly of claim 2, wherein the locking member comprises a segmented collar.

4. The flexible connection assembly of claim 3, wherein a bottom portion of the segmented collar defines a locking edge having a sharpened configuration arranged to engage the length of pipe.

5. The flexible connection assembly of claim 2, wherein an outer surface of the locking member defines a radial groove and the segment coupling member is positionable in the radial groove.

6. The flexible connection assembly of claim 2, wherein the segment coupling member comprises an elastomeric band.

7. The flexible connection assembly of claim 2, wherein the first end of the section of flexible hose defines a first opening, and further comprising a second pipe connector coupled to the section of flexible hose at a second opening of the section of flexible hose.

8. The flexible connection assembly of claim 7, wherein the second pipe connector is configured to couple to a non-swaged pipe end.

9. The flexible connection assembly of claim 7, wherein the second pipe connector includes:
   a second housing body defining a second axial bore configured to receive a second length of pipe, the second housing body having a first opening and a second opening opposite the first opening, the first opening configured to receive the second length of pipe into the second axial bore;
   at least one second sealing member positionable within the second axial bore and configured to form a seal between the second length of pipe and the second housing body within the second axial bore; and a second locking member positionable at the first opening of the second housing body configured as an annular ring having a plurality of teeth angled radially inward, the second locking member configured in size and shape to lock the second length of pipe within the second axial bore.

10. The flexible connection assembly of claim 9, further comprising a second retaining member attachable to the second housing body and arranged to secure the second locking member between the at least one second sealing member and the second retaining member.

11. A flexible connection system, comprising:
- a first pipe connector configured for coupling to a pipe or fitting having a swaged end, the first pipe connector including:
  - a housing body defining an axial bore arranged to receive a length of pipe, the length of pipe including an enlarged end section having an enlarged diameter;
  - a locking member defining a radial flange securable to the housing body outside of the axial bore, the locking member split into two or more segments selectively connectable together around the length of pipe and sized and configured to lock the enlarged end section of the length of pipe within the axial bore when the locking member is secured to the housing body, wherein the locking member includes a segment coupling member arranged to detachably secure the two or more segments together outside the axial bore and on a housing top of the housing body;
  - at least one sealing member positionable on the length of pipe between the enlarged end section and the locking member, the at least one sealing member arranged to compress against and between the enlarged end section of the length of pipe and the locking member;
  - a retaining member attachable to the housing body and defining an opening sized and configured to allow the enlarged end section of the length of pipe to pass therethrough, the retaining member being arranged to secure the locking member to the housing body;
- a second pipe connector, the second pipe connector including:
  - a second housing body defining a second axial bore configured to receive a second pipe portion, the second housing body having an upper section and a lower section and the second axial bore having an upper bore area configured to receive the second pipe portion and a lower bore area, the lower bore area having a smaller diameter that tapers from a diameter of the upper bore area so as to wedge a terminal end of the second pipe portion inserted therein;
  - a plurality of second sealing members positionable in the upper bore area and arranged to form a seal between the second pipe portion and the second housing body; and
  - a second locking member positionable above the plurality of second sealing members in the upper bore area, the second locking member defining a ring and a plurality of teeth angled radially inward from the ring, the second locking member arranged to lock the terminal end of the second pipe portion within the second axial bore; and
- a section of flexible hose having a first end and a second end; the first end being coupled to the first pipe connector and the second end being coupled to the second pipe connector to enable a flexible connection between the length of pipe and the second pipe portion.

\* \* \* \* \*